United States Patent [19]

Brewster

[11] Patent Number: 4,863,238

[45] Date of Patent: Sep. 5, 1989

[54] REFLECTIVE MARKER FOR AN OBJECT

[76] Inventor: Blair M. Brewster, 285 Westminster Rd., Rochester, N.Y. 14607

[21] Appl. No.: 201,296

[22] Filed: May 27, 1988

Related U.S. Application Data

[63] Continuation-in-part of Ser. No. 35,625, Apr. 3, 1987, abandoned.

[51] Int. Cl.[4] .................................................. G02B 5/12
[52] U.S. Cl. ...................................... 350/97; 350/103; 350/113; 40/594
[58] Field of Search ................ 350/97, 103, 107, 109, 350/113, 1.6, 589, 590; 40/582, 583, 584, 594

[56] References Cited

U.S. PATENT DOCUMENTS

| | | | |
|---|---|---|---|
| 1,048,343 | 12/1912 | Rice | |
| 1,203,714 | 11/1916 | Disser | |
| 2,327,605 | 8/1943 | Ryder | 350/107 |
| 2,367,067 | 12/1940 | Spieth | 88/82 |
| 2,956,476 | 10/1960 | Rupert | 350/103 |
| 3,739,271 | 6/1973 | Wetzel | 350/113 |
| 3,816,223 | 6/1974 | Ahn et al. | 350/1.6 |
| 3,877,786 | 4/1975 | Booras et al. | 350/105 |
| 4,016,665 | 4/1977 | Sakota | 40/594 |
| 4,246,709 | 1/1981 | Selleslags | 40/594 |
| 4,480,399 | 11/1984 | Teti, Jr. | 40/594 |

Primary Examiner—Bruce Y. Arnold
Assistant Examiner—Loha Ben
Attorney, Agent, or Firm—Cumpston & Shaw

[57] ABSTRACT

A reflective marker is disclosed for marking an object such as a highway pole, utility pole, transformer, and the like by reflective light. The reflective marker comprises a support layer, and a top plate affixed thereto having die-cut portions adapted, when removed, to form openings which cooperate with the support layer to define shallow recesses in the marker. The edges of the openings in the top plate act as a template for guiding rectangular labels containing reflective numbers into the shallow recesses into engagement with the support layer in aligned relation.

9 Claims, 2 Drawing Sheets

REFLECTIVE MARKER FOR AN OBJECT

This is a continuation-in-part of co-pending application Ser. No. 035,625 filed on Apr. 3, 1987, now abandoned.

FIELD OF THE INVENTION:

This invention relates generally to marking devices, and more specifically to a reflective marker for marking an object such as a highway pole, transformer, and the like by reflective light, and a method of assembling the reflective marker.

DESCRIPTION OF THE PRIOR ART:

The prior art is replete with patents disclosing various types of markers. For example, U.S. Pat. No. 1,048,343, which issued to A. V. Rice on Dec. 24, 1912, discloses a luminous sign plate having a luminous coating onto which letters or numbers are formed. A problem with this sign plate is that the luminous paint surface is interposed in spaced relation between a glass plate and a sheet metal base member with rubber gaskets therebetween. Such a marker can be easily destroyed by vandals, and is incapable of lasting very many years when subjected to breaking of the glass, rusting of the metallic elements, and deterioration of the rubber gaskets.

U.S. Pat. No. 1,203,714, which issued to L. J. Disser on Nov. 7, 1916, discloses an advertising dart of simple construction. The dart comprises a pointed element secured to one end of a weatherproofed metal plate onto which advertising indicia is placed. A problem with this dart is that the pointed element does not provide a very substantial mounting means for the dart and can be readily detached from the support. Also, the indicia on the metal plate is not very well protected, and is readily susceptible to weathering and defacing.

U.S. Pat. No. 4,480,399, which issued to Joseph A. Teti Jr. on Nov. 6, 1984, discloses a name plate made by providing an open type frame, which has an opening extending completely therethrough. The front face of the frame is recessed to receive individual letters each having a tongue which fits in the opening with its outer face co-planar with the outer surface of the frame. An adhesive member is secured across the outer faces of the frame and tongue. A problem with reflectors of this type is that special frames must be provided for names having different numbers of letters or blank or decorative plates must be added. In addition, all of the letters must be simultaneously in place when the adhesive layer is attached.

U.S. Pat. No. 4,246,709, which issued to Frank K. A. Selleslags on Jan. 27, 1981 shows a heat curlable identification carrying means having a transparent sheet and an adhesive backing layer for attaching the means to a substrate, the means also optionally having an intermediate sheet bearing or suitable for bearing indicia.

U.S. Pat. Nos. 2,367,067 and 3,877,786, which issued to W. O. Spieth and Booras et al, respectively, on Jan. 9, 1945 and Apr. 15, 1975 respectively, disclose reflectors that typically have a layer of large glass beads spaced a predetermined distance from a flat reflector. A problem with reflectors of this type is that the reflectors are of complicated construction, and the large glass beads thereof are susceptible to damage if the reflector is struck by an object, such as a rock or the like.

Self laminating tags and blanks to seal in or protect numbers and writing on a base member are also known in the art. Such tags or blanks comprise a thin flat base member for receiving writing or adhesive-backed numbers on the upper surface thereof. A clear plastic adhesive-backed cover sheet is stripped from an adhesive protective layer and laminated onto the upper surface to protect the writing or numbers. A problem with the blanks is that no provision is made for neatly guiding and aligning the numbers onto the upper surface.

Markers are commercially available that include a locking band encircled by yellow collars onto which black numbers are printed. The collars are slid onto the band, and the band fastened to an object by tie wraps. A problem with this marker is that the collar is rotatably movable on the band and the numbers thereon can quickly become misaligned.

Still another marker that is known in the art comprises a holding plate of generally C-shaped cross-section throughout its length for capturing numbers slid into the C-shaped section from one of the ends of the plate. A serious problem with this marker is that the numbers can readily slide out of the holding plate, thereby adversely affecting the long term reliability of the marker.

Another problem encountered with prior known markers of the type having a flat smooth marker surface is that the pole support or the like to which the marker is attached has irregular or bowed surfaces, and a mismatch occurs between the irregular surface of the pole support and the smooth marker surface resulting in the marker not being completely supported along its entire smooth, flat surface.

All of the aforementioned problems existing in prior known markers are belived to be addressed and overcome by the improved reflective marker of this invention.

SUMMARY OF THE INVENTION:

In accordance with a preferred embodiment of the invention, a marker and method of assembly are disclosed for marking an object, such as a highway pole, transformer, and the like, by reflecting light back to its source. In its broadest sense, the reflective marker comprises a top plate having an opening extending therethrough having edges forming a template, and a support layer having a surface affixed to a face of the top plate to form a shallow recess. The template guides a label containing a reflective indicia, such as a number, into the shallow recess into engagement with the support layer surface.

In a more specific aspect of the invention, the support layer comprises a deformable layer, and a film is interposed between the top plate and deformable layer and secured thereto.

In still another aspect of the invention, a method is disclosed of assembling a marker having a top plate provided with a die-cut portion, and a support layer affixed to the top plate. The method comprises the steps of:
- removing the die-cut portion from the top plate to form edges of a template on the support layer defining a shallow recess;
- guiding a label containing a reflective indicia into the recesses by the template and into engagement with the support layer; and
- affixing the label to the support layer.

A primary advantage or object of this invention is to provide an improved reflective marker that is of simplified design and construction, thoroughly reliable in operation, and economical to manufacture.

Another advantage or object of this invention is to provide a reflective marker that is formed from flat plastic sandwiched layers, and is extremely rugged and durable. Preferably, one of the layers of the marker is a deformable layer for conforming to the mismatched surfaces of the marker support member to provide better adhesion between the irregular or bowed surface of the support member and the flat, smooth surface of the marker.

Other advantages of the invention are to provide an improved reflective marker for having (1) a colorful yellow top plate, (2) a plurality of openings extending through the top plate having edges defining a template for guiding and aligning labels containing reflective indicia into shallow recesses. The recesses are formed by the openings and a contiguous support layer, and protect the indicia from undesired handling and damage, (3) cross bars between some of the recesses to create a desired spacing between one or more indicia, (4) the capacity to replace wrong or damaged indicia or to reuse the marker by merely applying new indicia over the old, and (5) the capability of assembling a reflective marker in the field at the site of the object to which the marker is to be applied.

The invention and its advantages will become more apparent from the detailed description of the invention presented below.

BRIEF DESCRIPTION OF THE DRAWINGS:

In the detailed description of the invention presented below, reference is made to the accompanying drawings, in which.

Figure 1:
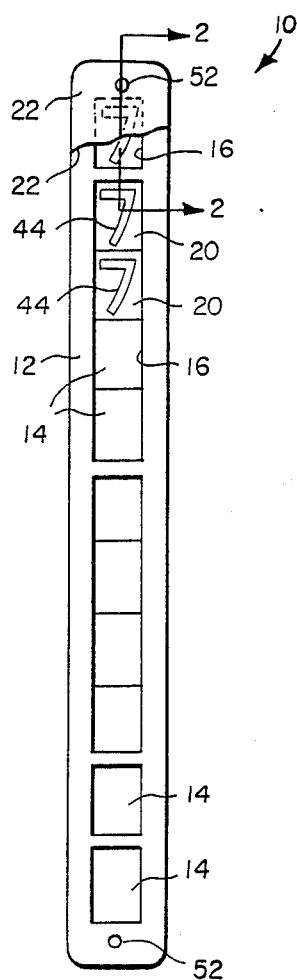
FIG. 1 is a top plan view of a preferred embodiment of the reflective marker of this invention.
Figure 2:
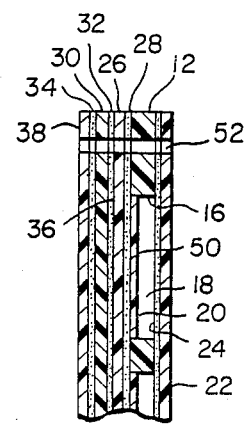
FIG. 2 is a section view in exaggerated form taken substantially along lines 2—2 of the marker of FIG. 1.

DETAILED DESCRIPTION OF THE INVENTION:

Referring now to FIGS. 1 and 2 of the drawings, a reflective marker 10 is disclosed for a pole, transformer, and the like. The reflective marker 10 comprises a thin top plate 12 of rectangular shape and preferably formed from a plastic material, such as styrene acrylonite with an olefinic elastomer. It also believed that other comparable materials can be used such as, for example, plastics such as polyethylene, and vinyl, and metals, such as regular or rust resistant steel, stainless steel, and aluminum. The top plate 12 is provided with die-cut portions 14 which, when removed, preferably during manufacture, form openings 16 extending therethrough having edges defining a template. The openings 16 cooperate with the remainder of the marker, which forms a bottom for the openings, to form shallow recesses 18 for guiding any suitable labels 20 containing indicia, such as reflective numbers, into the recesses. If desired, the top plate, after the labels 20 containing reflective numbers are all assembled, can be covered by a light transmitting cover sheet 22 having an ultra-violet blocking coating thereon. The cover sheet further has an adhesive layer 24 for securing the cover sheet to the outer surface of top plate 12.

The marker 10 is further provided with a thin middle layer 26, as best seen in FIG. 2, comprising an acrylic film or the like, such as, for example, polyvinyl fluoride, polyester or vinyl. The film 26 can also be made of a metal, such as stainless steel or aluminum, for example. The film 26 has one face thereof affixed to an adhesive coating 28 on the inner surface of top plate 12 and cooperates with openings 16 in top plate 12 to form the bottom of shallow recesses 18 for receiving labels 20 containing the reflective numbers.

The marker 10 further comprises a thin deformable layer 30, as best seen in FIG. 2, preferably formed from a closed cell neoprene or polyurethane foam material, or from an adhesive layer of a thickness of about 10 mils. The deformable layer has inner and outer adhesive surfaces 32, 34 respectively, of which the inner surface 32 is affixed to the opposite face 36 of film 26. The outer adhesive surface 34 of deformable layer 30 is covered or protected by an outer polyethylene liner 38 affixed thereto.

If top plate 12 is formed from a metal, such as regular or stainless steel or aluminum, the reflective marker 10 will be sufficiently rigid so that the middle film layer 26 may be omitted.

Figure 3:
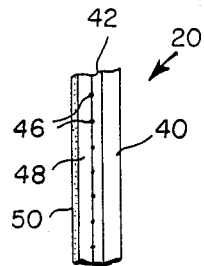
FIG. 3 is a side elevational view in exaggerated form of a commonly available label containing a reflective number.

The commercially available labels 20 containing the reflective numbers, as best seen in FIG. 3, preferably comprise a yellow acrylic film(s) 42 having an outer black coating 40 which defines a reverse printed clear number 44 (see FIG. 1). Highly dispersed minute glass beads 46 of a polygonal pattern are interposed in film(s) 42 and are covered by a polyethylene liner 48. The liner 48 has an adhesive coating 50 on the outer surface thereof for releasably securing a label 20 containing a reflective number onto a label holding sheet, not shown.

A method for assembling marker 10 with reflective labels 20 comprises initially removing the die-cut portions 14, preferably during manufacture, from the top plate 12 to form a template defining shallow recesses 18. The labels 20 containing reflective numbers are removed from the holding sheets one at a time and guided by the edges of openings 16 of the template into shallow recesses 18 into engagement with the support layer contiguous to top plate 12. Pressing each reflective label 20 downwardly causes the adhesive coating 50 on the rear surface thereof to affix the reflective label to the contiguous support layer. The assembled marker, which is about 95 mils thick, is then secured to a pole support surface or the like, not shown, by removing bottom liner 38 and pressing the adhesive layer 34 on the outer surface of the deformable layer into engagement with the pole support surface. The compressibility of deformable layer 30 provides better adhesion between any irregularities or mismatching that may occur between the irregular pole support surface and the flat, smooth marker surface. The marker further has openings 52 through which nails may be pounded into a wooden pole support for positively securing the marker to the pole support. Thus the marker can be adhesively secured and/or nailed in place.

A pole, transformer or the like marker in accordance with a presently preferred embodiment of this invention is illustrated in FIGS. 4 through 7. Both a single digit marker 60 and a multiple digit marker 70 are shown. Multiple digit identifying numbers may be formed by the use of a plurality of single digit markers, or by a multiple digit marker that is cut to length.

Figure 4:
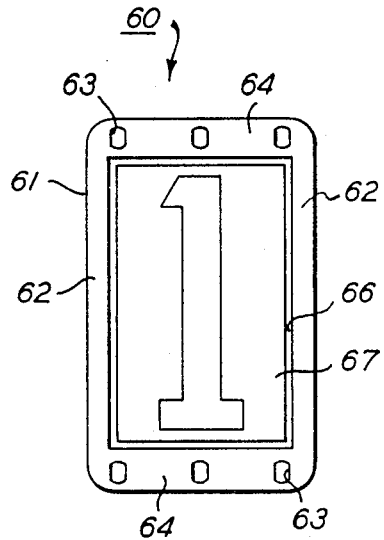
FIG. 4 is a front elevation of marker in accordance with another embodiment of this invention.

Referring now to FIG. 4, marker 60 includes a flexible digit receiving substrate that has a generally rectangular shape with rounded corners and an upstanding peripheral frame, including side walls 62 and end walls 64. The side and end walls together define a rectangular digit receiving recess 66, into which a label 67 bearing a suitable indicia is placed. Preferably, as described in connection with the embodiment illustrated in FIGS. 1 through 3, label 67 includes a reflective layer with an adhesive backing, the details of which are omitted from these figures for simplicity, but which are understood to be substantially identical to labels 20 described above.

A plurality of perforations 63 extends through end walls 64 of the marker 60 for facilitating the attachment of the marker to a pole, transformer or the like. The marker may be attached by nails, straps (preferably those of the type often referred to as tie-wraps), or other suitable fasteners. Preferably, the perforations 63 have flat sides and rounded ends, the better to receive tie-wrap type straps or the like, which are generally flat.

Preferably, the substrate 61 is made from a semi-flexible material, such as polycarbonate that has a high surface energy, for example 42 or more dynes per centimeter. Because the markers are designed to be used outdoors, the material is preferably selected to be resistant to degradation by rain and sun, as well as to the temperature extremes likely to be encountered in use, and particularly to be resistant to degradation by ultra-violet radiation. These criteria apply both to the substrate and to the label placed thereon. In addition, the label is preferably provided with a layer of adhesive that is selected to adhere tenaciously to the substrate material. Polycarbonate suitable for use in the markers of this invention has a relatively high surface energy, and therefore is suitable for use with a variety of adhesives, including acrylic adhesives.

Preferably, the thickness of label 67 is somewhat less than the depth of recess 76, so that when the marker is attached to a pole or transformer in a vertical orientation, the label is at least somewhat protected by the overhanging portion of the substrate. The adhesive layer between the substrate and the label is protected from degradation by water. In addition, width and height (not the thickness) of the label are preferably selected to substantially fill the recess. In this way, vandalism is inhibited by making the edges of the label inaccessible, thereby making it difficult to remove the labels from the marker after they are put in place.

In accordance with a preferred embodiment of this invention, black polycarbonate material is employed for the substrate 10. The contrast between the black polycarbonate substrate and the bright reflective numbers is a desirable feature of the invention.

Figure 5:
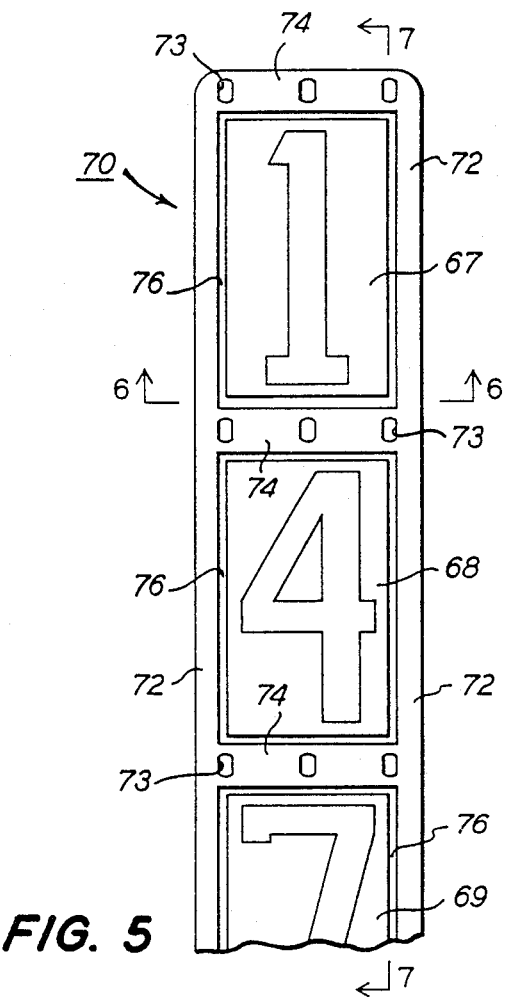
FIG. 5 is a front elevation of a portion of a multi-digit marker in accordance with an alternative embodiment of this invention.
Figure 6:
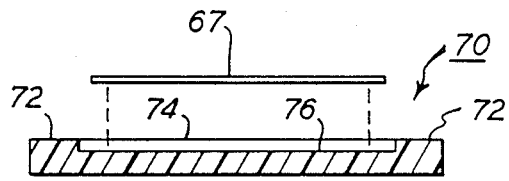
FIGS. 6 and 7 are sections taken along lines 6 and 7 respectively of FIG. 5.
Figure 7:
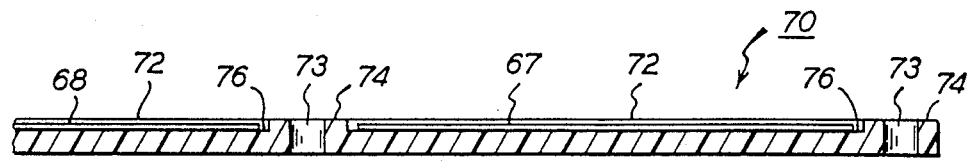

Multiple digit indicia may be most readily displayed in multiple cavity markers such as the pole and transformer marker 70 shown in FIGS. 5 through 7. The marker 70 includes an elongated substrate having longitudinally extending side walls 72 joined by spaced apart laterally extending end walls and interdigit barriers 74. The side walls, end walls, and interdigit barriers form a plurality of recesses 76, each adapted to receive an indicia bearing label 67, 68 and 69 respectively. As shown in the cross-sectional views of the marker illustrated at FIGS. 6 and 7, the indicia bearing label 67 is received in recess 76 and held in place by an adhesive layer not shown. Preferably, the recess is somewhat deeper than the thickness of the label, and protects the label as heretofore described. A plurality of perforations 73 extend through the end and interdigit walls of the substrate. Preferably, when an elongated multi-digit marker is attached to a pole or the like, fasteners such as nails, straps or the like are employed at spaced-apart locations.

Preferably, in a particular application where indicia including up to but not more than a predetermined number of digits are required, the marker 70 is fabricated with a corresponding number of recesses. If an appropriately sized substrate is not available, the substrates can be readily cut to shorter lengths in the field. Where greater numbers of digits are required than are available in on hand substrates, the ends of short substrates can be overlapped and held in place by nails, straps or other suitable fasteners passing through the aligned perforations in the overlapped substrates. Thus, great flexibility is provided. It is an advantage of the markers of this invention that they are particularly well suited to be assembled in the field. Thus, it is not necessary to premanufacture markers that may not be needed. Rather, if a crew discovers a damaged marker, a replacement can be readily assembled from a substrate and the appropriate labels, and immediately put into service.

The invention has been described in detail with particular reference to a preferred embodiment thereof, but it will be understood that variations and modifications can be effected within the spirit and scope of the invention.

What is claimed is:

1. A reflective marker for applying identifying indicia to a utility pole, transformer or the like, comprising:
   a flexible substrate adapted to be attached to said utility pole, transformer or the like, said substrate comprising a unitary body of plastic material having a label receiving identation having a recessed surface characterized by an adhesive compatible surface energy, for receiving a label, said substrate further comprising:
   a plurality of walls of a first height defining a label receiving area of said surface;
   a reflective indicia bearing label substantially coextensive said label receiving area and characterized by a thickness less than said first height, so that said label is protectively recessed in said substrate;
   a layer of adhesive disposed between said label and said surface for attaching said label to said substrate within said label receiving area; and
   a plurality of fastener receiving mounting holes formed in at least two of said walls.

2. A reflective marker for a pole, transformer, and the like according to claim 1 wherein the plastic material comprises a styrene acrylonite with an olefinic elastomer.

3. A reflective marker for a pole, transformer, and the like according to claim 1, and further comprising a light transmitting cover sheet covering said label receiving area.

4. A reflective marker for a pole, transformer, and the like according to claim 10 wherein the cover sheet has an ultra-violet blocking coating thereon.

5. A reflective marker according to claim 1 wherein said substrate comprises an elongate base and further comprises a plurality of intermediate walls of said first height dividing said surface into plurality of separate label receiving areas.

6. The reflective marker of claim 5 comprising a plurality of fastener receiving mounting holes in at least one of said intermediate walls.

7. The reflective marker of claim 1 wherein said substrate is substantially non-reflecting.

8. The reflective marker of claim 1 wherein said substrate combines polycarbonate resin.

9. The reflective marker of claim 1 wherein said substrate is black.

* * * * *